US005565246A

United States Patent [19]
Hyde

[11] Patent Number: 5,565,246
[45] Date of Patent: Oct. 15, 1996

[54] METHOD OF FORMING HEAT-RESISTANT RAISED PRINT FROM RADIATION-CURABLE SOLID PARTICULATE COMPOSITIONS

[76] Inventor: Timothy S. Hyde, 108 Park Place Dr., Cherry Hill, N.J. 08002

[21] Appl. No.: 496,255

[22] Filed: Jun. 28, 1995

Related U.S. Application Data

[63] Continuation-in-part of Ser. No. 359,015, Dec. 19, 1994, abandoned, which is a continuation-in-part of Ser. No. 264,415, Jun. 23, 1994, abandoned, which is a continuation of Ser. No. 955,402, Oct. 2, 1992, abandoned.

[51] Int. Cl.$^6$ .................. B05D 3/06; C08J 3/28; C08F 2/50
[52] U.S. Cl. .................. 427/504; 427/511; 427/510; 427/517; 522/90; 522/92; 522/100; 522/152; 522/153; 522/164; 522/175
[58] Field of Search .................. 430/961, 10; 427/504, 427/510, 511, 505; 101/462, 456, 457, 460; 522/152, 153, 164, 175, 90, 92, 100; 523/160

[56] References Cited

U.S. PATENT DOCUMENTS

| | | | |
|---|---|---|---|
| 3,844,916 | 10/1974 | Gaske | 522/100 |
| 3,911,160 | 10/1975 | Neuberg | 427/27 |
| 4,079,673 | 3/1978 | Bernstein | 101/462 |
| 4,254,163 | 3/1981 | Piazza | 427/96 |
| 5,102,737 | 4/1992 | Josephy et al. | 428/195 |
| 5,126,186 | 6/1992 | Cheek | 428/195 |

Primary Examiner—Susan W. Berman
Attorney, Agent, or Firm—Philip O. Post

[57] ABSTRACT

A method of forming heat-resistant raised print on a substrate using a thermographic radiation-curable powder by a thermographic process that includes radiation curing. The powders include free radical photoinitiated compositions of acrylated polymers and acrylate-modified aminoamides, and cationic photoinitiated compositions of resins using sulfonium salts.

25 Claims, No Drawings

METHOD OF FORMING HEAT-RESISTANT RAISED PRINT FROM RADIATION-CURABLE SOLID PARTICULATE COMPOSITIONS

This application is a continuation-in-part of application Ser. No. 08/359,015, filed on Dec. 19, 1994, which in turn is a continuation-in-part of application Ser. No. 08/264,415, filed on Jun. 23, 1994, which in turn is a continuation of application Ser. No. 07/955,402, filed on Oct. 2, 1992, all now abandoned.

This invention relates to radiation-curable, solid particulate, compositions and their use as thermoset powders in the art of thermographic printing. The compositions include acrylated polymers, acrylate-modified aminoamides and resins using sulfonium salts.

BACKGROUND OF THE INVENTION

Radiation-curable, acrylated epoxy polymer compositions have been used in various applications in non-particulate states as continuous coatings, films, layers and the like, with subsequent exposure to radiation, as disclosed by the following references.

| U.S. Pat. No. | Name | Date |
| --- | --- | --- |
| 4,156,035 | Tsao et al. | 05–79 |
| 4,179,400 | Tsao et al. | 12–79 |
| 4,234,399 | McDowell et al. | 11–80 |
| 4,343,885 | Reardon, Jr. | 08–82 |
| 4,357,219 | Sattler | 11–82 |
| 4,422,914 | Tsao et al. | 12–83 |
| 4,507,383 | Tsuruta et al. | 03–85 |
| 4,937,172 | Gervay | 06–90 |

Tsao et al. U.S. Pat. No. 4,156,035 discloses the use of radiation-curable acrylated epoxy compositions as a continuous layer or coating on various types of substrates with subsequent curing by ultraviolet light. The described compositions are of particular use in curing thick films of acrylated compositions. Gervay U.S. Pat. No. 4,937,172 describes the use of a layered radiation-curable composition with superior adhesion properties for photomasking areas of a substrate. McDowell et al. U.S. Pat. No. 4,234,399 teaches the art of radiation-curable compositions used as continuous film coatings with a desired viscosity. Sattler U.S. Pat. No. 4,357,219 discloses an epoxy coating which is first gelled with ultraviolet light and then cured thermally. It is of particular use in coating wire. Tsuruta et al. U.S. Pat. No. 4,507,383 describes a method of preparing material for a planographic plate which consists of a layer of finely divided solid particles adhering to a substrate. The particulate in this case is typically metallic and is applied in layers to form a rough surface support area for subsequently applied desensitizing agent. The particulate does not become a part of the printed material and is not radiation-cured. Reardon, Jr. U.S. Pat. No. 4,343,885 teaches the use of radiation-curable film epoxies which change color when subjected to radiation and are of particular use as dry photoresist films. Tsao et al. U.S. Pat. No. 4,222,914 describes radiation-curable liquid and solid epoxy compositions. Tsao et al U.S. Pat. No. 4,179,400 discloses a process of using sulfonium salts in radiation-curable epoxy compositions to hasten cudng of the compositions. Formulations of radiation-curable acrylate-modified amineamides are disclosed in the following references.

| U.S. Pat. No. | Name | Date |
| --- | --- | --- |
| 4,975,498 | Frihart | 12–90 |
| 4,987,160 | Frihart et al. | 01–91 |
| 5,155,177 | Frihart | 10–92 |
| 5,296,556 | Frihart | 03–94 |

All of these references teach the manufacture of acrylate-modified amineamides for use as a hot melt adhesive. Frihart U.S. Pat. No. 4,975,498 discloses thermally-curable compositions, and Frihart et al. U.S. Pat. No. 4,987,160 teaches actinic radiation-curable compositions for use as hot melt adhesives. Frihart U.S. Pat. No. 5,155,177 and Frihart U.S. Pat. No. 5,296,556 disclose the addition of a reactive diluent to the polyamide, which serves to reduce the viscosity of the polyamide for improved mixing to produce an acrylate-modified polyamide of relatively lower viscosity.

Cationic curing technology involves the photolysis of onium salts and certain other radiation activated compounds. When these materials are irradiated with actinic radiation of the proper wavelength, either Bronstead or Lewis acids are formed. These compounds yield cationic species that cause rapid polymerization of cyloaliphatic epoxides and copolymerization of epoxides and hydroxylic compounds such as glycols, polyols and similar active hydrogen containing compounds, vinyl ethers and other epoxides.

None of the prior art discloses the use of a radiation-curable, solid particulate compositions that can be later cured by exposure to actinic radiation, especially ultraviolet radiation, or radiation generated by a high energy electron beam. The present invention discloses radiation-curable, solid particulate compositions and process for treating the compositions which is of particular use in the art of thermographic printing. Compositions of acrylated polymers, acrylate-modified aminoamides and resins using sulfonium salts are disclosed.

The art of thermography is well known. Following the inking of a substrate, usually a paper sheet, to represent letters, numbers, drawings, and so forth, the inked substrate is covered with a finely ground powder of thermoplastic resin. The resin employed is usually a dimer acid based polyamide polymer that is ground and sifted to a particle size suitable for the size of the print type to be coated. The powder adheres to the wet ink when deposited onto the substrate. Any excess powder can be removed from the substrate. The inked substrate is then heated to a sufficient temperature in order to melt the powder. The particles of the powder flow together to produce the raised print effect. The inked substrate is then cooled whereby the thermoplastic resin reverts back to a solid state and becomes dry.

Thermography is the most flexible and economical way of producing raised print effects. There is no expense for engraved dies as thermography is an allied process to letterpress or offset lithographic printing.

Since the origination of thermography, photocopiers and laser printers have become common equipment for making copies and originals of printed material. Conventional thermoplastic powders used in thermography will melt when processed through high temperature photocopiers and laser printers. The typical melt point of raised print created with conventional thermographic powder is approximately 100 to 130 degrees centigrade. Laser printers and photocopiers operate in a higher temperature range, generally between 200 and 300 degrees centigrade. Consequently, paper that will be processed through this type of high temperature equipment has to be printed without the thermographic effect, or the thermographic raised print effect will be destroyed. The printing industry has expressed the need for the development of heat-resistant raised print to accommodate this high temperature equipment. Such a process is of particular use for the production of letterhead stationary which is used extensively in laser printers and photocopiers.

The present invention discloses radiation-curable, solid particulate compositions and process for treating the compositions so that when they are used as a thermographic powder, the composition will become thermoset and, after being irradiated with actinic radiation, will not remelt again when subjected to the operating temperatures of laser printers and photocopiers.

SUMMARY OF THE INVENTION

Radiation-curable powders which provide an essential improvement over present powders, in that the powder can be processed to withstand subsequent applications of high temperatures. The powders include acrylated polymers, acrylate-modified aminoamides and resins using sulfonium salts.

A process of exposing a radiation-curable powder to actinic radiation or radiation generated by a high energy electron beam in order to polymerize and thermoset the powder after it is applied to a printed substrate and melted.

Accordingly, an object of the invention is to provide new and improved powder compositions and processes for thermoserring thermography which will permit the use of relatively inexpensive thermographic printed materials in high temperature processing equipment, such as photocopiers and laser printers, without experiencing remelt of the raised print.

DETAILED DESCRIPTION OF THE INVENTION

The radiation-curable, solid particulate compositions employed in the present invention include polymers of unsaturated materials that polymerize very rapidly when the polymerization is initiated by free radicals formed when the composition is irradiated with actinic radiation, especially ultraviolet radiation, or radiation generated by a high energy electron beam. Photoinitiators are required for actinic irradiation because they absorb the radiation and form free radicals that initiate polymerization.

The unsaturated materials fall into three basic types: epoxies, urethanes and acrylics. Typical structures are Acrylated Epoxy Oligomer:

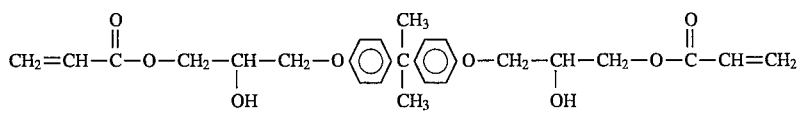

Aromatic Urethane Oligomer:

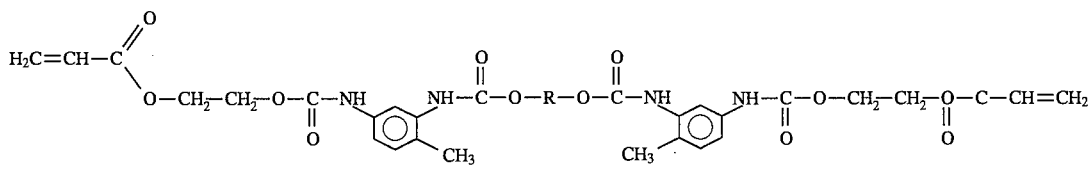

Acrylated Acrylic Oligomer:

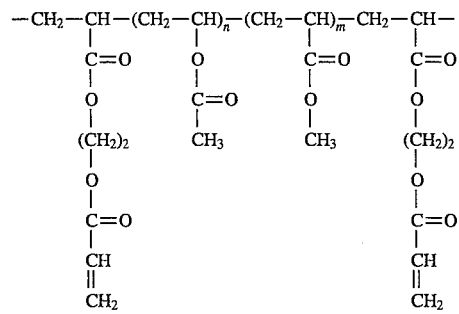

Acrylated epoxies have the largest variety of structures available and are the most often used oligomers. Acrylated epoxies are generally prepared by the reaction of acrylic or methacrylic acids with an epoxy resin. The acids open up the epoxy group forming an acrylic ester and a secondary hydroxyl group. Epoxy oligomers have excellent compatibility with other components in the composition because they contain aromatic, ester and hydroxyl components. Adhesion to various substrates is enhanced by the presence of these groups. The compositions employed in the invention are based on high molecular weight acrylated epoxy polymers. The epoxy polymer that will be reacted with acrylic or methacrylic acid can be of a variety of epoxy polymers. One such preferable polymer is the bisphenol A-epichlorohydrin epoxy polymer. The epoxide has the general formula

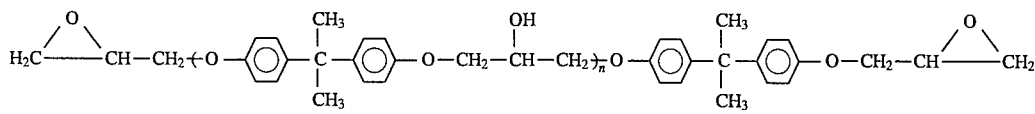

The epoxy should be a solid at room temperature. Examples of such commercially available polymers are EPON 1001 F, 1002F, 1004F, 1007F and 1009F (Shell Chemical Company, Houston, Tex.). These epoxies have an Epoxide Equivalent Weight (EEW) of about 525 to 3800. The epoxies generally preferred will have an EEW of about 525 to 950, and most preferably an EEW of 800 to 950. The relatively high melting point of epoxies in this range will inhibit sintering during storage of the resulting solid particulate composition. Mixtures of epoxies with different EEW or molecular weights can be employed when desired. Commercial sources of acrylated epoxy oligomers are the Henkel Corporation (Ambler, Pa.), Echo Resins (Versailles, Mo.), UCB Radcure, Inc. (Atlanta, Ga.) and Sartomer Company (Exton, Pa.).

In addition, the composition may include other components in order to provide flexibility to the radiation-curable composition. By experimentation, I have found that about 1 to 20 per cent levels, based on weight, of additives can be used to obtain the desired degree of flexibility. Acrylated urethanes can be employed as one such additive. This is an excellent method of providing flexibility because the acrylated urethane is compatible with acrylated epoxy and also is reactive when exposed to actinic radiation. Acrylated urethanes are prepared by the reaction of toluene diisocyanate with polyols, acrylic acid or hydroxyethyl methacrylic acid to form the urethane. Other components, such as polyethylene dibasic acid esters, can also be part of the urethane oligomer. By varying the composition of acrylated urethanes with acrylated epoxy, it is possible to obtain radiation-curable compositions with increased flexibility. Acrylated urethanes can be obtained from the commercial sources previously mentioned for acrylated epoxies.

By experimentation, I have found that additions of about 1 to 20 per cent of non-reactive plasticizers such as 1,4-cyclohexane dimethanol dibenzoate with the structure

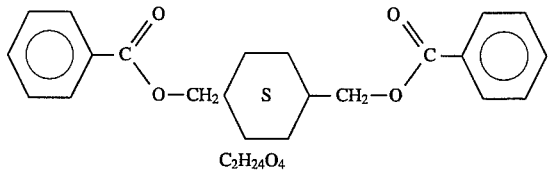

$C_2H_{24}O_4$ will also enhance flexibility. These additions are also useful in lowering the melt viscosity of the composition. Selection of a suitable plasticizer is limited by its boiling point. A relatively low boiling point results in vaporization of the plasticizer during the blending of the composition. Suitable plasticizers are commercially available from Velsicol Chemical Corporation (Rosemont, Ill.). The trade name for one such plasticizer is BENZOFLEX 352.

The composition may include a photoinitiator or sensitizer. Photoinitiators are essential to actinic radiation-curable compositions. When subjected to actinic radiation, they provide high energy, free radicals to initiate polymerization by inducing homolyric fragmentation of the excited photoinitiator into free radicals. Another process by which this occurs involves electron excitation of the photoinitiator from a ground state singlet to an excited triplet followed by electron transfer to a hydrogen atom donor with the generation of free radicals. Free radicals formed by either process are extremely reactive because of their excited electron states.

Photoinitiators generally found suitable for ultraviolet curing have absorption in the range of 180 to 420 nanometers. Most typical of these are aromatic ketones such as benzophenone and its derivatives, benzoin alkyl ethers or derivatives of acetophenone. Other common photoinitiators are included in the following table.

| Common Photoinitiators | |
|---|---|
| Benzoin Ethers: | Isobutyl benzoin ether |
| Benzil Ketals: | 2,2-Dimethoxy-2, phenylacetophenone |
| | Hydroxy cyclohexylphenyl ketone |
| Ketones: | Benzophenone |
| | Isopropyl thioxanthone |
| Acetophenones: | Diethoxyacetophenone |
| Thioxanthones: | 2-Chlorothioxanthone |
| | Isopropyl thioxanthone |

An acceptable level of photoinitiator in the preferred composition is from 1 to 5 per cent by weight, but most preferably from 2 to 3 per cent by weight. A good example would be 2,2-dimethoxy-2, phenylacetophenone, which is commercially available as IRGACURE 651 from the Ciba-Geigy Corporation, Hawthorne, N.Y. This is a benzil ketal type that is solid at room temperature and will melt quite easily into the composition. Because it is solid at room temperature, it will not significantly reduce the melt point of the blended composition. If desired, mixtures of photoinitiators can be employed.

The invention is illustrated in greater detail by the following examples, but these examples are not to be considered as limiting the present invention.

EXAMPLE 1

Each of the following epoxy acrylated polymers was created by adding all the components to a reaction flask and heating under nitrogen to a temperature of approximately 135 degrees centigrade for about three hours. The reaction was deemed to be complete when the acid number of the composition diminished and leveled off. The resin was discharged and cooled to room temperature (nominally 22 degrees centigrade). In each example, two equivalents of epoxy are reacted with two equivalents of acrylic acid. An excess of either reactant may be used to drive the reaction to completion. The components used for the first resin of this example are indicated in Table 1. The triethylamine is used as a catalyst, and the monomethyl ether of hydroquinone is used as a thermal inhibitor to prevent gelling of the resin.

TABLE 1

| (Resin A) | |
|---|---|
| Components | Weight (grams) |
| Epoxy resin, EPON 1002F, commercially available from Shell | 630 |

TABLE 1-continued

(Resin A)

| Components | Weight (grams) |
| --- | --- |
| Chemical Co., Houston, TX | |
| Acrylic acid, technical grade, commercially available from BASF Corp., Chemical Division, Parsippany, NJ | 75 |
| Triethylamine, commercially available from BASF Corp., Chemical Division, Parsippany, NJ | 7 |
| Monomethyl ether of hydroquinone (MEHQ), commercially available from Eastman Chemical Products Inc., Kingsport, TN | 0.42 |

The produced resin (Resin A) had a final acid number of 1.0.

The components used for the second resin of this example are indicated in Table 2. The triethylamine is used as a catalyst, and the monomethyl ether of hydroquinone is used as a thermal inhibitor to prevent gelling of the resin.

TABLE 2

(Resin B)

| Components | Weight (grams) |
| --- | --- |
| Epoxy resin, EPON 1002F, commercially available from Shell Chemical Co., Houston, TX | 455 |
| Epoxy resin, EPON 1004F, commercially available from Shell Chemical Co., Houston, TX | 262 |
| Acrylic acid, technical grade, commercially available from BASF Corp., Chemical Division, Parsippany, NJ | 75 |
| Triethylamine, commercially available from BASF Corp., Chemical Division, Parsippany, NJ | 8 |
| Monomethyl ether of hydroquinone (MEHQ), commercially available from Eastman Chemical Products Inc., Kingsport, TN | 0.47 |

The produced resin (Resin B) had a final acid number of 1.1. Its melt viscosity was also higher than Resin A due to the addition of the EPON 1004F epoxy resin.

All compositions were prepared in a similar manner. The acrylated epoxy, Resin A or Resin B, was placed in a reactor and heated to 150 degrees Centigrade, while being agitated, to liquefy the resin. The photoinitiator and other components indicated in each of the examples were added and allowed to blend while still being agitated. Photoinitiators are used in all of the examples since the compositions were cured by actinic radiation.

For this example, only a photoinitiator was added to observe the characteristics of the obtained composition without any other additives. Two compositions, one with Resin A and the other with Resin B, were prepared with components in proportions as shown in Table 3.

TABLE 3

| Components | Weight (grams) |
| --- | --- |
| Resin A or Resin B | 100 |
| 2,2-dimethoxy-2, phenyl- | 2.75 |

TABLE 3-continued

| Components | Weight (grams) |
| --- | --- |
| acetophenone, IRGACURE 651, commercially available from Ciba-Geigy Corp., Hawthorne, NY | |

After 10 to 15 minutes of blending, an adequate mixture of the composition was observed. The composition was discharged and cooled to room temperature. It was then crushed, ground, and sifted to remove a particle size of approximately 80 microns. Generally, particles in the range of 74 to 90 microns are desirable for use as thermographic powders.

Each of the resulting solid particulate compositions, or powders, was cured in the same manner. The sifted powder was applied to inked paper as a thermographic powder and allowed to melt and fuse as taught in the art of thermography. The powder adhering to the inked areas of the paper was then cured by subjecting it to ultraviolet radiation. In each of the examples, ultraviolet radiation rated at 300 watts per inch passed over the coated paper at a speed of 75 feet per minute. Other sources of actinic radiation, or electron beam radiation, may be used to cure the powder on the inked paper. Also, other substrates may be used instead of paper.

Each of the cured compositions was then tested for heat resistance by pressing the coated paper to a hot plate heated to about 300 degrees Centigrade. No melting of the cured composition was observed.

EXAMPLE 2

Having formulated the basic curable resins of Example 1, a composition with improved flexibility and better melt flow was next sought. Four representative compositions, two each with Resin A and Resin B of Example 1, with a reactive plasticizer, were prepared according to the process described in Example 1 with components in proportions as shown in Tables 4 and 5.

TABLE 4

| Components | Weight (grams) |
| --- | --- |
| Resin A or Resin B (Example 1) | 100 |
| Aliphatic urethane diacrylate, EBECRYL 8803, commercially available from UCB Radcure, Inc., Atlanta, GA | 5 |
| 2,2-dimethoxy-2, phenyl-acetophenone, IRGACURE 651, commercially available from Ciba-Geigy Corp., Hawthorne, NY | 2.75 |

TABLE 5

| Components | Weight (grams) |
| --- | --- |
| Resin A or Resin B (Example 1) | 100 |
| Aliphatic urethane diacrylate, EBECRYL RSX 89423, commercially available from UCB Radcure, Inc., Atlanta, GA | 5 |
| 2,2-dimethoxy-2, phenyl-acetophenone, IRGACURE 651, commercially available from Ciba-Geigy Corp., Hawthorne, NY | 2.75 |

For each composition, a solid particulate composition, or powder, was prepared and cured as described in Example 1.

Each composition of this example exhibited better flexibility than the compositions of Example 1. No melting of the cured compositions occurred when they were subjected to the heat test of Example 1.

EXAMPLE 3

Compositions with non-reactive plasticizers were also formulated. Representative compositions are the two listed (one with Resin A and the other with Resin B of Example 1) in Table 6.

TABLE 6

| Components | Weight (grams) |
| --- | --- |
| Resin A or Resin B (Example 1) | 100 |
| 1,4-cyclohexane dimethanol dibenzoate, BENZOFLEX 352, commercially available from Velsicol Chemical Corp., Rosemont, IL | 10 |
| 2,2-dimethoxy-2, phenyl- acetophenone, IRGACURE 651, commercially available from Ciba- Geigy Corp., Hawthorne, NY | 3.0 |

For each composition, a solid particulate composition, or powder, was prepared and cured as described in Example 1. Each composition of this example exhibited better flexibility and melt flow than the compositions of Example 1. Also, the melt viscosities of the compositions in this example were lower than those for the compositions of Example 1. No melting of the cured compositions occurred when they were subjected to the heat test of Example 1.

EXAMPLE 4

Having favorable results with compositions including a reactive plasticizer or a non-reactive plasticizer, I experimented with compositions containing both of these ingredients. Two representative compositions, (one with Resin A and the other with Resin B of Example 1) were prepared according to the process described in Example 1 with components in proportions as shown in Table 7.

TABLE 7

| Components | Weight (grams) |
| --- | --- |
| Resin A or Resin B (Example 1) | 87 |
| Aliphatic urethane diacrylate, EBECRYL 8803, commercially available from UCB Radcure, Inc., Atlanta, GA | 8 |
| 1,4-cyclohexane dimethanol dibenzoate, BENZOFLEX 352, commercially available from Velsicol Chemical Corp., Rosemont, IL | 5 |
| 2,2-dimethoxy-2, phenyl- acetophenone, IRGACURE 651, commercially available from Ciba- Geigy Corp., Hawthorne, NY | 3.0 |

For each composition, a solid particulate composition, or powder, was prepared and cured as described in Example 1. These compositions resulted in the most favorable product in terms of flexibility, melt viscosity and melt flow. No melting of the cured compositions occurred when they were subjected to the heat test of Example 1.

By further experimentation, I have found that the following formulation of the compositions of this example will provide a useful product: at least 65 percent by weight of a radiation-sensitive acrylated epoxy polymer; about 1 to 20 percent by weight of a radiation-sensitive plasticizer; and about 1 to 20 percent by weight of a non-reactive plasticizer. If the composition is to be irradiated by actinic radiation, as in this example, then about 1 to 5 percent by weight of a photoinitiator is required.

EXAMPLE 5

A composition with improved flow and leveling was sought by the addition of an acrylated silicon to the epoxy acrylates of Example 1 (Resin A and Resin B). The compositions in Tables 8 and 9 were prepared by the process described in Example 1.

TABLE 8

| Ingredients | Weight (grams) |
| --- | --- |
| Resin A or Resin B (Example 1) | 100 |
| Acrylated silicone, EBECRYL 350, commercially available from UCB Radcure, Inc., Atlanta, GA | 1.0 |
| 2,2-dimethoxy-2, phenyl- acetophenone, IRGACURE 651, commercially available from Ciba- Geigy Corp., Hawthorne, NY | 2.75 |

TABLE 9

| Ingredients | Weight (grams) |
| --- | --- |
| Resin A or Resin B (Example 1) | 100 |
| Acrylated silicone, BYK-371, commercially available from BYK- Chemie USA, Wallingford, CT | 1.0 |
| 2,2-dimethoxy-2, phenyl- acetophenone, IRGACURE 651, commercially available from Ciba- Geigy Corp., Hawthorne, NY | 2.75 |

For each composition, a solid particulate composition, or powder, was prepared and cured as described in Example 1.

Each of the compositions of this example provided better flow and leveling than the compositions of Example 1. No melting of the cured compositions occurred when they were subjected to the heat test of Example 1.

I experimented with other compositions with less favorable results. A composition with a lower melt viscosity was pursued by the addition of various waxes to the epoxy acrylates of Resin A and Resin B of Example 1. These compositions were found to be unsatisfactory due to a cloudy white appearance which rendered them unusable as a thermographic powder.

I have practiced my invention using the chemistry of acrylate-modified aminoamide polymers that are curable by actinic radiation. Cured properties of this chemistry demonstrate excellent adhesion, flexibility and resistance to heat.

Aminoamide polymers are a well-known class of polymers and are commercially available from suppliers such as Union Camp Corporation (Wayne, N.J.), and Henkel Corporation (Ambler, Pa.). These polymers are available in liquid or solid form. The preparation of polymers in this class is described in U.S. Pat. No. 3,377, 303 (Peerman et al.). As I practice my invention, preferred aminoamides include those prepared from the condensation reaction of polymeric dimer acid, linear dicarboxylic acid, linear monocarboxylic acid and an amine component.

Preparation of a radiation-curable, acrylate-modified aminoamide polymer is performed by the Michael addition reaction of a polyol ester having multiple acrylate ester groups (polyfunctional acrylate) such as, but not limited to, trimethylolpropane triacrylate to the amino-hydrogen ester groups of an aminoamide polymer. For the purpose of preparing a radiation-curable, acrylate-modified aminoamide polymer, the selected aminoamide polymer should be amine functionally terminated with amine-hydrogen ester groups. Amine functionality is expressed in terms of an amine value number. Lower amine functionality is expressed with a lower amine value number; higher amine functionality is expressed with a higher amine value number. I have found that an amine value of between 8 and 40 will work best with my invention. The selected aminoamide polymer should also be a solid at room temperature of 25 degrees centigrade and have a melt point greater than 100 degrees centigrade. A melt point above 100 degrees centigrade will provide properties to the acrylate-modified aminoamide polymer that will allow the polymer to be subsequently crushed and ground. A melt point of between 100 and 120 degrees centigrade is most desirable.

To perform the Michael addition reaction, the aminoamide and polyfunctional acrylate coreactants must be brought to a single phase. This can be accomplished by placing the aminoamide and the preferred polyfunctional acrylate in a vessel and heating to a minimum melt temperature so that the coreactants liquefy. A single phase can be achieved with agitation or stirring of the coreactants in the vessel, which results in completion of the Michael addition reaction. The presence of an inhibitor, such as monomethyl ether of hydroquinone, is desirable during the Michael addition reaction to prevent premature gelation of the coreactants. Addition of a photoinitiator is required to initiate free radical polymerization with actinic radiation. Typical photoinitiators are aromatic ketones, such as benzophenone and its derivatives, benzoin alkyl ethers or derivatives of acetophenone. Other suitable photoinitators are identified elsewhere in this specification. The photoinitiator can be added to the acrylate-modified aminoamide polymer during the melt phase, after the Michael addition reaction has been completed, and blended to a uniform composition. The melt composition is then discharged from the vessel and cooled to a solid at room temperature. To practice my invention of forming heat-resistant raised print, the solid composition is then ground into a powder.

For the purpose of preparing a powder to form heat-resistant raised print, I prepared a composition from quantities of commercially available aminoamide polymer, trimethylolpropane triacrylate, monoethyl ether of hydroquinone inhibitor, and a photoinitiator. The aminoamide polymer that I used was VERSAMID 1655, which is available from the Henkel Corporation, Ambler, Pa. This particular aminoamide polymer, a solid at room temperature, has an amine value of 18 and a melt point of 120 degrees centigrade. Trimethylolpropane triacrylate was used as the polyfunctional acrylate ester coreactant for completion of the Michael addition reaction. A higher proportion of trimethylolpropane triacrylate and a lower proportion of aminoamide will result in a polymer with higher acrylate functionality, and consequently, a faster cure response to actinic radiation. A faster cure response is sometimes desirable for the thermographic printing process. The composition in Table 10 was prepared.

TABLE 10

| Components | Weight (grams) |
|---|---|
| Aminoamide polymer, VERSAMID 1655, commercially available from | 100 |

TABLE 10-continued

| Components | Weight (grams) |
|---|---|
| Henkel Corporation, Ambler, PA | |
| Trimethylolpropane triacrylate (TMPTA), commercially available from CPS Chemical Company, Old Bridge, NJ | 14.2 |
| Monomethyl ether of hydroquinone (MEHQ), commercially available from Eastman Chemical Products Inc., Kingsport, TN | 0.13 |
| Photoinitiator 2,2-dimethoxy-2 phenylacetophenone, IGRACURE 651, commercially available from Ciba-Geigy Corporation, Hawthorne, NY | 3.5 |

The aminoamide polymer was placed in a reactor that was equipped with a stirrer and heated to 150 degrees centigrade to liquefy the polymer. When the melt point of approximately 120 degrees centigrade was reached, the aminoamide polymer melted to a liquid state and was agitated by stirring. A pre-blended liquid mixture of trimethylolpropane triacrylate and monomethyl ether of hydroquinone was added during the agitation process. After about 20 minutes, or until a uniform mixture is observed, the Michael addition reaction of the aminoamide and trimethylolpropane triacrylate should be completed. At this point, the 2,2-dimethoxy-2 phenylacetophenone was added to the liquid, and the stirring was continued for an additional five minutes to complete the mix of the composition. The melt was discharged from the reactor and cooled to a solid at room temperature. The solid was crushed, ground, and sifted to remove a particle size of approximately 80 microns.

As I practice my invention, a wet ink was applied to a substrate, in this instance, paper, as commonly done in the art of thermography. The sifted powder was applied to the wet inked paper as a thermographic powder, and the powder adhered to the wet ink. Heat was applied to the powder adhering to the ink on the paper. The heat caused the particles of powder to flow and fuse with the wet ink, as taught in the art of thermography, thereby forming a raised melt over the ink on the paper. This melt was then cured by subjecting it to ultraviolet radiation. Ultraviolet radiation rated at 300 watts per inch passed over the paper at a speed of 75 feet per minute. It was observed that a slower speed provided a more complete curing. Also, it was observed that additional exposure to heat during ultraviolet radiation curing can enhance the speed of cure of the melt.

The cured composition was then tested for heat resistance by pressing the coated paper to a hot plate heated to about 300 degrees centigrade. No melting of the cured composition was observed.

For the purpose of preparing a powder to form heat-resistant raised print, I have found that the formulation of at least 90 percent by weight of an acrylate-modified aminoamide polymer and about 10 percent by weight of photoinitiator will provide a useful product.

I have experimented and practiced my invention using sulfonium salts. There are several types of commercially available cationic photoinitiators that provide a product with superior thermal resistance when they are used to initiate crosslinking of a bisphenol-A-diglycidylether (BPA) epoxy resin. Some examples of these resins are commercially available as EPON 1002F and EPON 1004F from Shell Chemical Company, Houston, Tex. Some examples of cationic photoinitiators include aryldiazonium, diphenyliodonium and triphenylsulfonium salts. One such commercially available photoinitiator, FX-512, is a triphenyl sulfonium hexafluoro phosphate, and is available from the 3M Company, St. Paul, Minn.

The high reactivity of vinyl ether monomers with onium salt cationic photoinitiators is well known. Blends of vinyl ethers and epoxides will cure many times faster than one hundred percent BPA epoxy systems when exposed to actinic radiation. Triethylene glycol divinyl ether, RAPI-CURE DVE-3, is available from GAF Chemicals Corporation, Wayne, N.J., and is useful when blended with BPA epoxy resins.

The compositions in Tables 11 through 14 were prepared in a similar manner. The solid BPA epoxy resin was placed in a reactor and heated to approximately 150 degrees centigrade, while being agitated, to liquefy the resin. The other components indicated in each of the compositions were added and allowed to blend while still being agitated.

TABLE 11

| Components | Weight (grams) |
| --- | --- |
| Epoxy resin, EPON 1002F, commercially available from Shell Chemical Co., Houston, TX | 100 |
| Triphenyl sulfonium hexafluoro phosphate, commercially available from 3M Company, St. Paul, MN | 4 |

TABLE 12

| Components | Weight (grams) |
| --- | --- |
| Epoxy resin, EPON 1004F, commercially available from Shell Chemical Co., Houston, TX | 100 |
| Triphenyl sulfonium hexafluoro phosphate, commercially available from 3M Company, St. Paul, MN | 4 |

TABLE 13

| Components | Weight (grams) |
| --- | --- |
| Epoxy resin, EPON 1004F, commercially available from Shell Chemical Co., Houston, TX | 100 |
| Triphenyl sulfonium hexafluoro phosphate, commercially available from 3M Company, St. Paul, MN | 4 |
| Triethlene glycol divinyl ether, commercially available from GAF Chemical Company, Wayne, NJ | 5 |

TABLE 14

| Components | Weight (grams) |
| --- | --- |
| Epoxy resin, EPON 1002F, commercially available from Shell Chemical Co., Houston, TX | 100 |
| Triphenyl sulfonium hexafluoro phosphate, commercially available from 3M Company, St. Paul, MN | 4 |
| Triethylene glycol divinyl ether, commercially available from GAF Chemical Company, Wayne, NJ | 5 |

After 10 to 15 minutes of blending, an adequate mixture of each composition was observed. Each composition was discharged and cooled to room temperature. It was then crushed, ground, and sifted to remove a particle size of approximately 80 microns.

Each of the resulting solid particulate compositions, or powders, was cured in the same manner. A wet ink was applied to a substrate, in this instance, paper, as commonly done in the art of thermography. The sifted powder was applied to the wet inked paper as a thermographic powder, and the powder adhered to the wet ink. Heat was applied to the powder adhering to the ink on the paper which caused the particles of powder to flow and fuse with the wet ink, as taught in the art of thermography, thereby forming a raised melt over the ink on the paper. This melt was then cured by subjecting it to ultraviolet radiation. In each of the examples, ultraviolet radiation rated at 300 watts per inch passed over the paper at a speed of 75 feet per minute. It was observed that a slower speed provided a more complete curing. Also, it was observed that additional exposure to heat during ultraviolet radiation curing can enhance the speed of cure of the melt.

Each of the cured compositions was then tested for heat resistance by pressing the coated paper to a hot plate heated to about 300 degrees centigrade. No melting of the cured composition was observed.

By further experimentation, I have found that the following formulation will provide a useful product: at least 80 percent by weight of a BPA epoxy resin; about 3 to 8 percent by weight of a cationic photoinitiator; and about 2 to 10 percent by weight of a vinyl ether monomer.

The compositions and processes set forth above are the best mode for carrying out my invention and are presented for illustration and not limitation to exact details of operation or the exact compounds described. Modifications and equivalents will be apparent to those skilled in the art.

The method of applying a thermographic powder to inked print on substrates, usually paper, is well known to those skilled in the art of thermography. The paper can be letterhead stationary. Any one of the radiation-curable powders disclosed in this specification is applied by this method to the inked print on the substrate. The powder will adhere to the wet inked pdnt. Next, the substrate with the applied powder is heated to a sufficient temperature to melt the powder so that the solid particles will flow and fuse together above the inked print to produce the raised print effect. At this point, as my invention is practiced, the radiation-curable melted powder is cured by actinic radiation, typically ultraviolet radiation in the range of 180 to 420 nanometers, in order to obtain a permanent non-remeltable raised print effect on the substrate. The irradiation may also be accomplished by a high energy electron beam. The melted and polymerized raised print is then allowed to cool to room temperature. Now, if a paper substrate, which has raised print formed by the radiation cured powder as practiced by my invention, is used in a laser printer or as copy paper in a photocopier, the raised print will not result in a remelt and deformation as the paper is processed through the laser printer or copier.

I claim:

1. A method of forming heat-resistant raised prim comprising the following steps in the order named:

applying a wet inked print to a substrate;

applying a radiation-curable acrylated polymer powder comprising suitable amounts of an oligomer selected from the group consisting essentially of acrylated epoxy oligomers, acrylated urethane oligomers and acrylated acrylic oligomers to the wet inked print on the substrate whereby the powder adheres to the wet inked print;

heating the powder to melt temperature whereby the powder flows and fuses with the wet inked print to form a raised radiation-curable melt;

irradiating the melt whereby the melt polymerizes and forms a heat-resistant raised radiation-cured melt on the substrate.

2. The method according to claim 1 wherein the substrate is a paper.

3. The method according to claim 2 wherein the paper is letterhead stationary.

4. The method according to claim 1 wherein the radiation-curable acrylated polymer powder comprises:

a radiation-sensitive oligomer selected from the group consisting essentially of acrylated epoxy oligomers, acrylated urethane oligomers and acrylated acrylic oligomers of at least 65 percent by weight;

a radiation-sensitive plasticizer of about 1 to 20 percent by weight; and a non-reactive plasticizer of about 1 to 20 percent by weight.

5. The method according to claim 1 wherein irradiating the melt is accomplished by high energy ionizing radiation.

6. The method according to claim 4 wherein the radiation-sensitive plasticizer is selected from the group consisting of acrylated urethanes prepared by reacting toluene diisocyanate with polyols, acrylic acid or hydroxyethyl methacrylic acid.

7. The method according to claim 4 wherein the non-reactive plasticizer is 1,4-cyclohexane dimethanol dibenzoate.

8. The method according to claim 1 wherein the radiation-curable acrylated polymer powder comprises:

a radiation-sensitive oligomer selected from the group consisting essentially of acrylated epoxy oligomers, acrylated urethane oligomers and acrylated acrylic oligomers of at least 65 percent by weight, a radiation-sensitive plasticizer of about 1 to 20 percent by weight;

a non-reactive plasticizer of about 1 to 20 percent by weight; and a photoinitiator of about 1 to 5 percent by weight.

9. The method according to claim 8 wherein irradiating the melt is accomplished by ultraviolet radiation.

10. The method according to claim 8 wherein irradiating the melt is accomplished by actinic radiation.

11. The method according to claim 8 wherein the radiation-sensitive plasticizer is selected from the group consisting of acrylated urethanes prepared by reacting toluene diisocyanate with polyols, acrylic acid or hydroxyethyl methacrylic acid.

12. The method according to claim 8 wherein the non-reactive plasticizer is 1,4-cyclohexane dimethanol dibenzoate.

13. The method according to claim 1 wherein the radiation-curable acrylated powder further comprises an acrylated silicone oligomer of about 1 to 5 percent by weight.

14. The method according to claim 1 wherein the radiation-curable acrylated polymer powder comprises:

a radiation-sensitive oligomer selected from the group consisting essentially of acrylated epoxy oligomers, acrylated urethane oligomers and acrylated acrylic oligomers of about 95 percent by weight, and a photoinitiator of about 1 to 5 percent by weight.

15. The method according to claim 14 wherein irradiating the melt is accomplished by ultraviolet radiation.

16. The method according to claim 14 wherein irradiating the melt is accomplished by actinic radiation.

17. The method according to claim 1 wherein the radiation-curable acrylated polymer powder comprises:

a radiation-sensitive oligomer selected from the group consisting essentially of acrylated epoxy oligomers, acrylated urethane oligomers and acrylated acrylic oligomers of about 75 percent by weight;

a non-reactive plasticizer of about 1 to 20 percent by weight; and a photoinitiator of about 1 to 5 percent by weight.

18. The method according to claim 17 wherein the non-reactive plasticizer is 1,4-cyclohexane dimethanol dibenzoate.

19. The method according to claim 17 wherein irradiating the melt is accomplished by ultraviolet radiation.

20. The method according to claim 17 wherein irradiating the melt is accomplished by actinic radiation.

21. A method of forming heat-resistant raised print comprising the following steps in the order named:

applying a wet inked print to a substrate;

applying a cationic-initiated radiation-curable powder comprising suitable amounts of a bisphenol-A-diglycidylether epoxy resin, photoinitiator and vinyl ether monomer to the wet inked print on the substrate whereby the powder adheres to the wet inked print;

heating the powder to melt temperature whereby the powder flows and fuses with the wet inked print to form a raised radiation-curable melt;

irradiating the melt whereby the melt polymerizes and forms a heat-resistant raised radiation-cured melt on the substrate.

22. The method according to claim 21 wherein the cationic-initiated radiation-curable powder comprises:

a bisphenol-A-diglycidylether epoxy resin of at least 80 percent by weight;

a cationic photoinitiator of about 4 to 10 percent by weight; and a vinyl ether monomer of about 2 to 10 percent by weight.

23. The method according to claim 22 wherein the cationic photoinitiator is selected from the group consisting of aryldiazonium, diphenyliodonium and triphenylsulfonium salts.

24. A method of forming heat-resistant raised print comprising the following steps in the order named:

applying a wet inked print to a substrate;

applying a radiation-curable powder comprising suitable amounts of an acrylate-modified aminoamide and a photoinitiator to the wet inked print on the substrate whereby the powder adheres to the wet inked print;

heating the powder to melt temperature whereby the powder flows and fuses with the wet inked print to form a raised radiation-curable melt;

irradiating the melt whereby the melt polymerizes and forms a heat-resistant raised radiation-cured melt on the substrate.

25. The method according to claim 24 wherein the radiation-curable powder comprises an acrylate-modified aminoamide polymer of at least 90 percent by weight and a photoinitiator of about 3 to 10 percent by weight.

* * * * *